US010012474B2

(12) United States Patent
Teetzel et al.

(10) Patent No.: US 10,012,474 B2
(45) Date of Patent: Jul. 3, 2018

(54) COMBINED LASER RANGE FINDER AND SIGHTING APPARATUS HAVING DUAL FUNCTION LASER AND METHOD

(71) Applicant: Wilcox Industries Corp., Newington, NH (US)

(72) Inventors: James W. Teetzel, Portsmouth, NH (US); Gary M. Lemire, Lee, NH (US)

(73) Assignee: Wilcox Industries Corp., Newington, NH (US)

( * ) Notice: Subject to any disclaimer, the term of this patent is extended or adjusted under 35 U.S.C. 154(b) by 532 days.

(21) Appl. No.: 14/055,084

(22) Filed: Oct. 16, 2013

(65) Prior Publication Data

US 2015/0247703 A1   Sep. 3, 2015

Related U.S. Application Data

(60) Provisional application No. 61/716,879, filed on Oct. 22, 2012.

(51) Int. Cl.
| | |
|---|---|
| *G01C 3/08* | (2006.01) |
| *F41G 3/06* | (2006.01) |
| *G01S 17/08* | (2006.01) |
| *G01S 7/481* | (2006.01) |
| *F41G 1/36* | (2006.01) |
| *G01S 17/02* | (2006.01) |
| *F41G 3/14* | (2006.01) |

(52) U.S. Cl.
CPC ............... *F41G 3/065* (2013.01); *F41G 1/36* (2013.01); *F41G 3/145* (2013.01); *G01S 7/4813* (2013.01); *G01S 17/023* (2013.01); *G01S 17/08* (2013.01)

(58) Field of Classification Search
CPC . F41G 3/065; F41G 1/36; F41G 3/145; G01S 7/4813; G01S 17/023; G01S 17/08
See application file for complete search history.

(56) References Cited

U.S. PATENT DOCUMENTS

| | | | |
|---|---|---|---|
| 5,171,933 A | * | 12/1992 | Eldering ................... F41G 3/06 235/414 |
| 5,555,662 A | | 9/1996 | Teetzel |
| 5,669,174 A | | 9/1997 | Teetzel |

(Continued)

OTHER PUBLICATIONS

Berkeley Lab. "Laser Safety Protocol #003". May 2008. http://www2.lbl.gov/ehs/safety/lasers/assets/docs/protocols/lsp003.pdf.*

(Continued)

*Primary Examiner* — Samantha K Abraham
(74) *Attorney, Agent, or Firm* — McLane Middleton, Professional Association

(57) ABSTRACT

A combined range finding and sighting apparatus for a weapon includes a housing therein supporting one or more laser emitters, an optical detector for detecting an optical signal reflected from the target, and a processor. The one or more laser emitters includes a first laser emitter operable in a first mode for emitting an optical signal toward the target a second mode for projecting a first beam onto the target. The processor is coupled to a computer readable memory encoded with executable instructions and is configured, upon execution of the executable instructions, to calculate a distance to the target based on a time of flight of the optical signal. In a further aspect, a method of using a combined range finding and sighting apparatus is provided.

42 Claims, 7 Drawing Sheets

(56) References Cited

U.S. PATENT DOCUMENTS

| | | | | |
|---|---|---|---|---|
| 6,072,572 | A * | 6/2000 | Hatfield | F41G 3/326 250/342 |
| 6,568,118 | B1 | 5/2003 | Teetzel | |
| 7,726,061 | B1 | 6/2010 | Thummel | |
| 7,784,192 | B2 * | 8/2010 | Jancic | F41G 1/35 33/286 |
| 8,047,118 | B1 | 11/2011 | Teetzel et al. | |
| 8,100,044 | B1 | 1/2012 | Teetzel et al. | |
| 8,561,518 | B2 | 10/2013 | Teetzel et al. | |
| 2007/0274353 | A1 * | 11/2007 | Hauck | F41H 13/0056 372/9 |
| 2009/0320348 | A1 * | 12/2009 | Kelly | F41G 1/38 42/119 |
| 2010/0220309 | A1 * | 9/2010 | Zhu | G01C 3/08 356/4.01 |
| 2011/0047851 | A1 * | 3/2011 | Mock | F41C 23/16 42/72 |
| 2011/0121159 | A1 * | 5/2011 | Mourar | F41G 3/02 250/203.2 |
| 2012/0167426 | A1 * | 7/2012 | O'Clair | F41A 11/02 42/14 |

OTHER PUBLICATIONS

Devon Turner and Martin H. Ettenberg. "Shortwave infrared laser detection and tracking on the battlefield." Mar. 1, 2008. http://www.militaryaerospace.com/articles/print/volume-19/issue-3/departments/electro-optics-watch/shortwave-infrared-laser-detection-and-tracking-on-the-battlefield.html.*

U.S. Appl. No. 14/635,177, filed Mar. 2, 2015, entitled "Modular Sighting Assembly and Method".

Wilcox Industries Corp., Wilcox Rapid Targeting Module—Lite (RAPTAR-LITE) brochure (2012-13).

Wilcox Industries Corp., Wilcox Rapid Targeting and Ranging Module (RAPTAR) brochure (2012-13).

Wilcox Industries Corp. and Vectronix Inc., Rapid Acquisition Airing Module (RAAM) brochure.

* cited by examiner

COMBINED LASER RANGE FINDER AND SIGHTING APPARATUS HAVING DUAL FUNCTION LASER AND METHOD

CROSS-REFERENCE TO RELATED APPLICATION

This application is a non-provisional of U.S. provisional application No. 61/716,879 filed Oct. 22, 2013. The aforementioned application is incorporated herein by reference in its entirety.

BACKGROUND

The present disclosure relates to a laser sighting assembly for firearms and more particularly to a laser sighting assembly with laser range finding capability having a dual mode laser operable in both a sighting mode of operation and a range-finding mode of operation.

Laser sighting or targeting systems are known in the art for sighting a firearm on an intended target. Commonly, a laser sight is mounted on a firearm, such as an accessory mounting rail. When properly aligned with the barrel of the firearm, the laser will direct a beam to the target, which will appear as a dot on the target where the bullet will strike when the gun is fired.

The wavelength of the sighting laser may be in the visible region, typically red or green, e.g., for use in daylight conditions. Under nighttime or other low light conditions when a night vision system is used, an infrared (IR) sighting laser may be employed having a laser that emits a beam in the infrared region to which the night vision system is sensitive. For example, a sighting laser in the near-infrared region (NIR) (e.g., about 750-1400 nanometers, typically about 800-900 nm) would be viewable to a user wearing a conventional night vision system employing image intensifier ($I^2$) technology.

Likewise, thermal imaging systems are known which are sensitive to the thermal infrared region, such as medium-wave infrared (MWIR) (e.g., 3,000-8,000 nm) or long-wave infrared (LWIR) (e.g., 8,000-15,000 nm). Thermal imaging technology has also been combined with conventional night vision technology. For example, enhanced vision systems (e.g., enhanced night vision goggles or ENVGs) are known which sense both NIR and thermal IR. A sighting laser in either the NIR region would be viewable by opposing forces equipped with either conventional night vision systems or with enhanced night vision systems.

Laser range finding devices are known which provide an accurate measurement of the distance to a target. In such units, a laser sends a beam toward a target and reflections of the beam from the target are detected by an optical receiver. The distance to the target is calculated based on the time-of-flight of the laser beam. The range finder typically emits a laser beam in a very short series of pulses, which may be encoded to assist the detector in recognizing the reflected signal.

Integrated systems that combine a laser sight (i.e., an aiming or pointing laser) and an optical range finder system are also known. Typically, such combined systems employ one or more separate lasers for sighting and a dedicated laser for range finding. For example, a combined laser sight may employ a sighting module having an infrared laser in the NIR region so as to be visible to persons using a night vision system based image intensifier technology (e.g., night vision goggles), and a range finding module using a dedicated laser in the short-wave infrared (SWIR) region rendering it invisible to the human eye, diurnal vision systems, as well as to night vision goggles and thermal (MWIR and LWIR) cameras or imagers. In this manner, such a system having separate sighting and range finding lasers are capable of remaining covert both to the human eye and to enemies having image intensifier and/or thermal imaging systems when used for range finding.

Prior art systems have not heretofore provided a laser sighting and range finding unit having single, dual function sighting and range finding laser for a number of reasons. First, it is preferable to employ a laser that is not detectable by conventional night vision or thermal imaging technology so that the range finding emissions do not inadvertently disclose the user's position to enemies. Second, the sighting laser is typically operated to produce a continuous beam, whereas the range finding laser is operated to provide a very brief pulse or series of pulses.

It is, therefore, the object of the present disclosure to provide an improved laser sighting and range finding unit which eliminates the need for a dedicated IR sighting laser and a separate, dedicated range finding laser, while remaining invisible to night vision and thermal imaging technology. By providing a single, dual-purpose IR laser, the cost and size of the unit may be reduced over comparable systems using separate sighting and range finding lasers.

SUMMARY

In one aspect, a combined range finding and sighting apparatus for a weapon includes a housing therein supporting one or more laser emitters, an optical detector for detecting an optical signal reflected from the target, and a processor. The one or more laser emitters includes a first laser emitter operable in a first mode for emitting an optical signal toward the target a second mode for projecting a first beam onto the target. The processor is coupled to a computer readable memory encoded with executable instructions and is configured, upon execution of the executable instructions, to calculate a distance to the target based on a time of flight of the optical signal.

In a more limited aspect, the first beam is substantially in alignment with a trajectory of a projectile fired from the weapon.

In another more limited aspect, the first laser emitter is a short wave infrared (SWIR) laser emitter.

In yet another more limited aspect, the first laser emitter is configured to emit electromagnetic radiation having a wavelength that is invisible to one or both of a human eye and a night vision device employing an image intensifier.

In still another more limited aspect, the first laser emitter is configured to emit electromagnetic radiation having a wavelength in the range of from about 1400 nm to about 3000 nm.

In another more limited aspect, the wavelength is approximately 1550 nm.

In yet another more limited aspect, the first laser emitter is configured to emit electromagnetic radiation having a wavelength that is visible to a night vision system employing a short wave infrared imaging system.

In a further more limited aspect, the short wave infrared imaging system is of the type having an indium gallium arsenide (InGaAs) sensor.

In still another more limited aspect, the apparatus further comprises a first actuator switch on the housing configured to actuate the first laser emitter in the first mode of operation, and, a second actuator switch on the housing configured to actuate the first laser emitter in the second mode of operation.

In yet another more limited aspect, the apparatus includes a first actuator switch on the housing configured to actuate the first laser emitter in the first mode of operation. A second laser emitter is supported within the housing and configured to project a second beam substantially in alignment with a trajectory of a projectile fired from the weapon. A selector is provided for selecting one of the first laser emitter and the second laser emitter. A second actuator switch is provided on the housing configured to actuate the selected one of the first laser emitter in the second mode of operation and the second laser emitter.

In yet a further more limited aspect, the apparatus further includes a second laser emitter supported within the housing and configured to project a second beam substantially in alignment with a trajectory of a projectile fired from the weapon.

In another more limited aspect, the second laser emitter is selected from a visible laser emitter and an infrared laser emitter.

In still another more limited aspect, the second laser emitter is a near-infrared laser emitter.

In another further limited aspect, the apparatus comprises a third laser emitter supported within the housing and configured to project a third beam substantially in alignment with a trajectory of a projectile fired from the weapon, wherein the second laser emitter is an infrared laser emitter and the third laser emitter is a visible laser emitter.

In yet another more limited aspect, the apparatus includes a first actuator switch on the housing configured to actuate the first laser emitter in the first mode of operation. A selector is provided for selecting one of the first laser emitter, the second laser emitter, and the third laser emitter. A second actuator switch is provided on the housing configured to actuate the selected one of the first laser emitter in the second mode of operation, the second laser emitter, and the third laser emitter.

In yet another more limited aspect, the apparatus further includes an illuminator supported within the housing, the illuminator including a light emitting element for illuminating the target.

In yet another more limited aspect, the light emitting element is a fourth laser emitter.

In yet another more limited aspect, the fourth laser emitter is an IR laser emitter.

In another more limited aspect, the apparatus further comprises adjustable optics for adjusting a beam angle of light emitted by the illuminator.

In yet another more limited aspect, the apparatus further includes a first actuator switch on the housing configured to actuate the first laser emitter in the first mode of operation. A selector is provided for selecting one of the first laser emitter, the second laser emitter, the second laser emitter in combination with the illuminator, and the third laser emitter. A second actuator switch on the housing configured to actuate the selected one of the first laser emitter in the second mode of operation, the second laser emitter, the second laser emitter in combination with the illuminator, and the third laser emitter.

In still another more limited aspect, the selector further includes a "range" selection or position, wherein the second actuator switch is disabled when the selector is in the "range" selection or position.

In another more limited aspect, the selector is a rotary switch.

In yet another more limited aspect, the apparatus further includes a human viewable display and the selector is a user operable display screen interface displayed on the human viewable display.

In still another more limited aspect, the apparatus further comprises an illuminator supported within the housing, the illuminator including a light emitting element for illuminating the target.

In yet another more limited aspect, the apparatus further comprises a fastener for attaching the apparatus to a firearm.

In still another more limited aspect, the fastener is a clamping member configured to attach to a firearm rail interface.

In yet another more limited aspect, the apparatus further comprises one or more mechanical sights on the housing.

In another more limited aspect, the optical signal has a duration in the range of about 10 milliseconds to about 1000 milliseconds.

In yet another more limited aspect, the optical signal comprises a plurality of optical pulses.

In yet another more limited aspect, the first beam is selected from a continuous beam and a pulsed beam having a pulse frequency that is sufficiently high to allow the pulsed beam to appear as a substantially continuous beam.

In yet another more limited aspect, the pulsed beam has a pulse frequency in the range of about 5 Hertz to about 60 Hertz.

In still another more limited aspect, the apparatus further comprises a display for displaying a numerical indication of the distance to the target.

In another more limited aspect, the numerical indication of the distance to the selected target is selected from one or both of an actual distance to the selected target and an effective ballistic distance to the selected target.

In yet another more limited aspect, the apparatus further includes a power supply supported within the housing.

In yet another more limited aspect, the apparatus further includes a first adjustment means for changing an alignment of the apparatus to effect windage changes in a trajectory of a laser beam generated by the first laser emitter. A second adjustment is also provided for changing the alignment of the apparatus to effect elevation changes in the trajectory of a laser beam generated by the first laser emitter.

In still another more limited aspect, the one or more laser emitters are removably supported in the housing.

In yet another more limited aspect, the apparatus further includes a laser module removably supported in the housing. The laser module including the first laser emitter and at least one additional laser emitter, wherein each of the at least one additional laser emitter is affixed in co-aligned relation with the first laser emitter.

In another aspect, a method of using a combined range finding and sighting apparatus includes supporting one or more laser emitters, an optical detector, and a processor within a housing. The processor is coupled to a computer readable memory encoded with executable instructions. A first one of the one or more laser emitters is activated in a first mode to emit an optical signal toward a target. The optical signal reflected from the target is detected with the optical detector. The processor executes the executable instructions to calculate a distance to the target based on a time of flight of the optical signal. The first laser emitter is activated in a second mode to project a first beam onto the target.

In another more limited aspect, the method further includes mounting the combined range finding and sighting apparatus to a weapon, wherein the first beam is projected substantially in alignment with a trajectory of a projectile fired from a weapon.

In yet another more limited aspect, the method herein further includes outputting the calculated distance to a human viewable display.

In still another more limited aspect, the first laser emitter emits electromagnetic radiation having a wavelength that is invisible to one or both of a human eye and a night vision device employing an image intensifier.

In further more limited aspect, the first laser emitter emits electromagnetic radiation having a wavelength in the range of from about 1400 nm to about 3000 nm.

In yet another more limited aspect, the wavelength is approximately 1550 nm.

In still another more limited aspect, the first laser emitter emits electromagnetic radiation having a wavelength that is visible to a night vision system employing a short wave infrared imaging system.

In another more limited aspect, the short wave infrared imaging system is of the type having an indium gallium arsenide (InGaAs) sensor.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT

Figure 1:
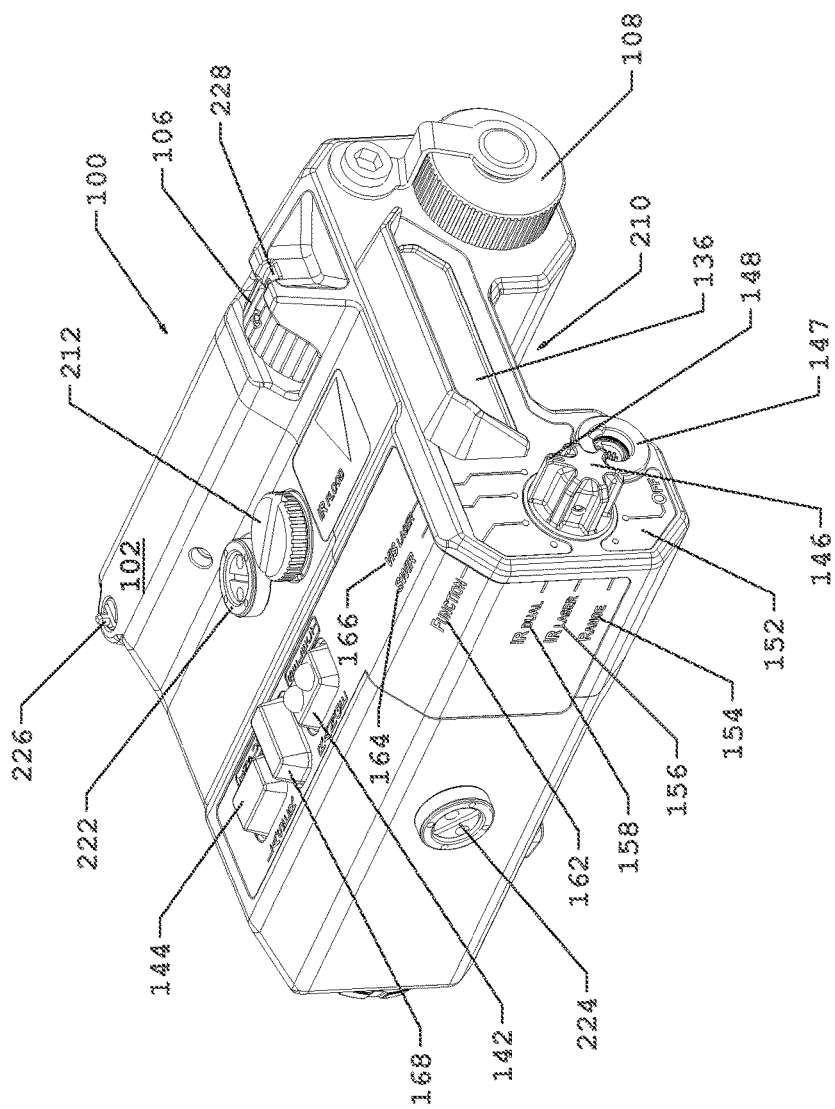
FIG. 1 is an isometric view, taken generally from the rear, of a combined laser sighting and range finding assembly with dual function IR laser in accordance with a first exemplary embodiment of the present invention.
Figure 2:
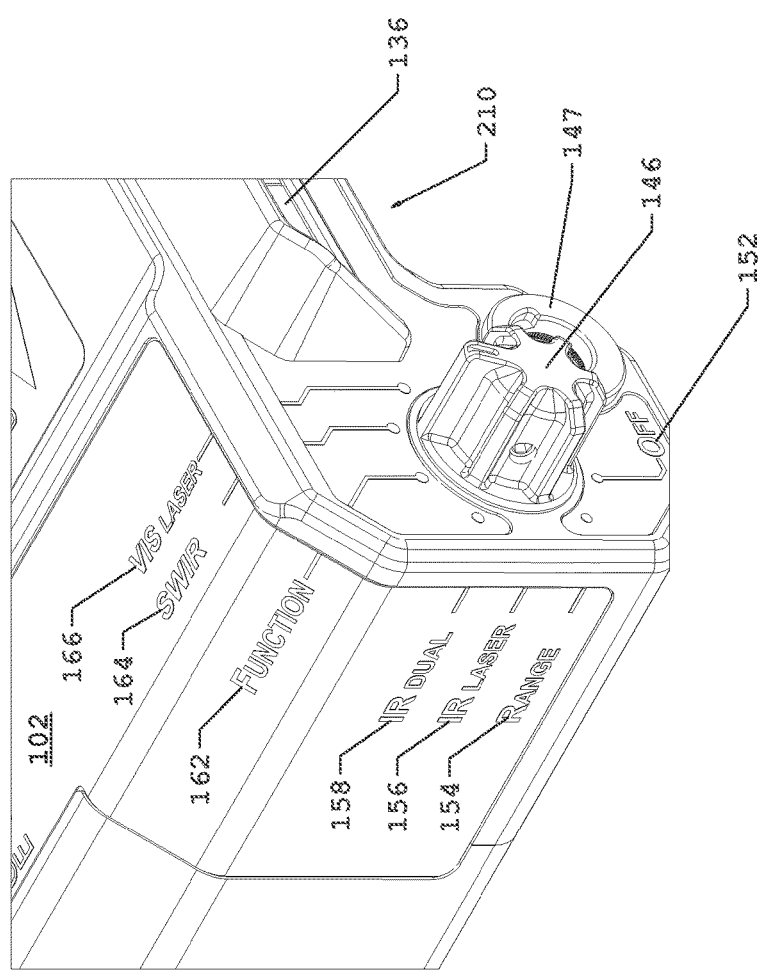
FIG. 2 is an enlarged, fragmentary view of the apparatus appearing in FIG. 1.
Figure 3:
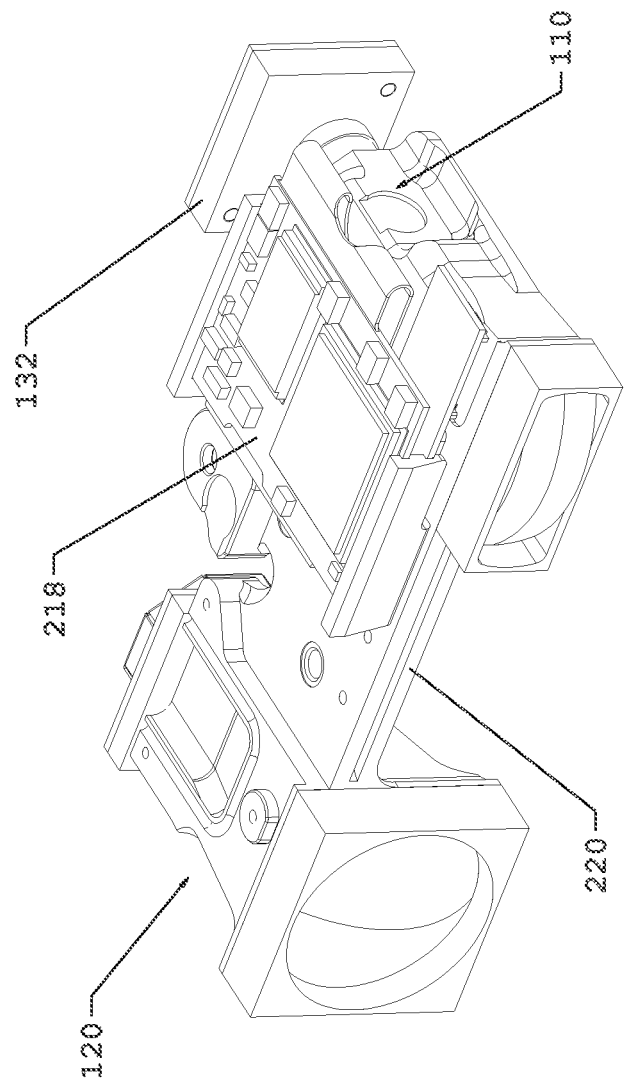
FIG. 3 is an isometric view of the unit appearing in FIG. 1 with the housing cover and auxiliary laser assemblies removed, illustrating the dual mode SWIR laser and optical receiver modules.
Figure 4:
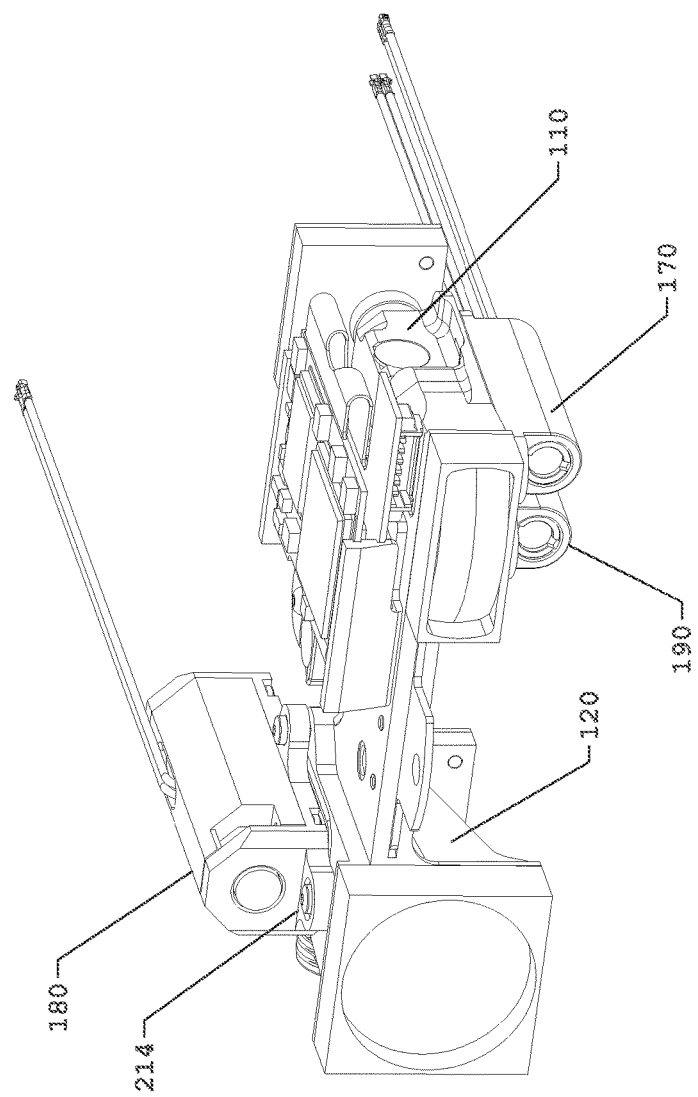
FIG. 4 is an isometric view similar to the view appearing in FIG. 3, also showing the visible laser and the first and second IR lasers.

Referring to the drawings, FIGS. 1-6 illustrate an exemplary combined laser sighting and range finding apparatus 100 which includes a SWIR laser module or assembly 110 and an optical receiver module or assembly 120. The SWIR laser module 110 includes a laser 112 driven by laser driver electronics 132 under the control of a processor 134, such as a microprocessor, microcontroller, or the like. The components of the unit 100 are received within a housing 102. One or more switches, selectors, keypad buttons, or the like are provided for accessing the various functions of the unit 100, designated generally as input/output (I/O) circuitry 140, as described below in connection with the illustrated exemplary embodiment.

A SWIR laser signal 116 emitted by the laser 112 passes through optics 114, which may comprise a lens or lens array 114 and which may include other optical elements, including reflective optical elements, refractive optical elements, or combinations for focusing and/or directing the beam 116 toward a target The laser beam 116 may have a wavelength which is in the short-wave IR region or sufficiently near the short-wave IR region so as to be visible to night vision systems employing a SWIR imaging system, such as a SWIR camera of the type having an indium gallium arsenide (InGaAs) sensor. Preferably, the laser 112 emits a beam having a wavelength in the range of from about 1400 nm to about 3000 nm, more preferably about 1550 nm.

In operation, to use the unit 100 for range finding, the unit is pointed at a target to be ranged. For example, in the illustrated embodiment which is especially adapted for weapon-mounted use, the user may aim the weapon at the target using a weapon-mounted scope or sight that has been co-aligned with the unit 100. Alternately, an integral sight comprising front and rear mechanical sights 226, 228, e.g. iron sights, on the housing 102 may also be employed. When the unit 100 is aimed at the target, the range select button or switch 142 is pressed, which actuates the SWIR laser 112 in a range finding mode. In preferred embodiments, actuation of the range select button or switch 142 is operable to activate the SWIR laser 112, irrespective of the position of mode selector knob or switch 146 (with the exception of the "off" and "function" positions, in which cases operation of the lasers are disabled. In the illustrated embodiment, the range select button or switch 142 is a button.

The beam 116, when actuated in the range finding mode, is a very short duration, e.g., in the range of about 10 milliseconds to about 1000 milliseconds. The beam 116 is emitted and focused by the lens array 114, and reflected from the target as a reflected beam 126, which is received by the optical receiver 120. The reflected beam 126 passes through optics 124 such as a lens or an array of lenses of the receiver 120, and which may include other optical components, to direct the reflected beam 126 to a photosensor 128, such as a camera, photodetector, etc.

The microprocessor 134 calculates the time period between the emission of the emitted beam 116 by the laser 112 and the detection of the reflected beam 126 by the sensor 128. The calculated distance to the target may be output in human viewable form to a display 136. The distance to the target may be used by the operator, for example, to determine whether the target is within the range of a given weapon or to allow the user to adjust his or her aim to account for range, e.g., to compensate for ballistic drop of the bullet or other fired projectile. The calculated range could also be communicated to an optical scope, sight, weapon video display, or the like, to displace a reticle or dot so that it appears at the point of impact based on a ballistics computation. The calculated range could also be fed to a fire control system or another weapon system.

To access the second, pointing or sighting mode of operation, the mode selector knob or switch 146 is rotated until it points to a desired laser (or lasers) to use for sighting/pointing and the laser button or switch 144 is pressed or activated. It will be recognized that the button or switch 144 may operate in a variety of manners. In the illustrated embodiment, the laser button or switch 144 is a button. For example, the button or switch 144 could operate as a simple toggle, wherein the selected pointing laser operates in a steady on mode when the button or switch 144 is pressed for first time and turned off when the button or switch 144 is pressed a second time. Other options are also contemplated. For example, in an alternative embodiment, the selected laser is turned on while the button or switch 144 is pressed and turned off when the button or switch 144 is released. In still further embodiments, on and off functions can be accessed by button press combinations the selected laser is turned on while the button or switch 144 is pressed and turned off when the button or switch 144 is released. For example, in a still further embodiment, laser can turned on while the button 144 is pressed and turned off when the button or switch 144 is released, but can be turned on and remain on following a double tap of the button or switch 144, i.e., by pressing the button twice in rapid succession. In another option, the steady on condition may be achieved by holding the button or switch 144 down for some predetermined period of time, e.g., several seconds. In still further embodiments, the multiple button behaviors may be provided, and which can be selected by the user via the FUNCTION menu hierarchy.

In the illustrated embodiment of FIG. 1, the mode selector knob or switch 146, includes an indicator element 148 and can be rotated until it is aligned with a desired one of multiple selections or positions, including an "OFF" selection or position 152, "RANGE" selection or position 154, "IR LASER" selection or position 156, "IR DUAL" selection or position 158, "FUNCTION" selection or position 162, "SWIR" selection or position 164, and "VIS LASER" selection or position 166.

When the mode selector knob or switch 146 is in the "OFF" position 152, the unit is powered down. When the mode selector knob or switch 146 is in the "RANGE" position 154, the range button or switch 142 is operable to actuate the SWIR laser 112. In the preferred embodiment, all laser pointing or sighting functions are disabled when the mode selector knob or switch 146 is in the "RANGE" position 154.

When the mode selector knob or switch 146 is in the "IR LASER" position 156, the button or switch 144 is operable to actuate a first IR laser module or assembly 170 including a first IR laser 172 and associated optics 174. The button or switch 144 can be actuated in this mode to emit an IR beam 176 for sighting/pointing, e.g., by placing an IR dot on a target. The beam 176 is preferably in the NIR region and visible to persons utilizing night or low light vision systems employing image intensifier technology, such as night vision goggles or enhanced night vision goggles. When the mode selector knob or switch 146 is in the "IR LASER" position 156, the SWIR laser module 110 may still be actuated in range finding mode when the button or switch 142 is pressed.

When the mode selector knob or switch 146 is in the "IR DUAL" position 158, the button or switch 144 is operable to simultaneously actuate the first, sighting IR laser 172 as discussed above, as well as a second IR laser module 180, including a second IR laser 182 and associated optics 184. The second IR laser module 180 functions as an IR illuminator or flashlight. When the button or switch 144 is actuated in the DUAL IR mode the second IR laser 182 is actuated to emit a beam 186 for illuminating a target area and further wherein the sighting beam 176 appears as a dot centered in the illuminated area. A rotatable adjustment wheel 106 is provided to allow the divergence of the illumination beam 186 to be adjusted to a desired beam angle, e.g., by controlling the optics 184. For example, the beam angle may range from a relatively wide-angle flood beam, e.g., about 10 degrees or greater, to a focused spot. The IR illumination beam 186 is preferably in the NIR region and visible to persons utilizing night or low light vision systems employing image intensifier technology. When the mode selector knob or switch 146 is in the "DUAL IR" position 158, the SWIR laser may still be actuated in range finding mode when the button or switch 142 is pressed.

When the mode selector knob or switch 146 is in the "SWIR" position 164, the button or switch 144 is operable to actuate the laser 112 in the aiming/sighting/pointing mode, such that the emitted beam 116 is visible using a SWIR vision system. The SWIR spot can be placed on an intended target, e.g., to show the intended point of impact, or to designate a target for attack by other personnel or another weapon system.

Unlike prior art systems, the dual-purpose laser 112 herein is also employed as a pointing laser. Lasers employed in prior art laser range finders normally employ high power monoblock crystal lasers which are operated to emit short, high power laser pulses. Furthermore, the pulses in such prior art laser range finders must be time spaced in order to achieve sufficient peak power and are not capable of a pulse repetition rate that would allow the pulse train to appear as a substantially continuous beam. In contrast, the present system employs a SWIR laser, which may be a laser diode, operable in the pointing mode to emit a beam at a pulse repetition rate that is sufficiently high to allow the pulsed beam to appear as a substantially continuous beam In the aiming mode of operation of the presently disclosed system, the laser 112 may be a SWIR laser diode and the SWIR beam 116 is emitted as a pulsed beam to avoid excessive heating of the laser 112. The pulses may be emitted for a duration and at a frequency such that the beam 112 appears as a substantially continuous beam to a user donning a SWIR vision system. The pulse frequency may be in the range of from about 5 Hz to about 60 Hz, and is preferably in the range of from about 10 Hz to about 25 Hz. In this manner, a laser dot can be seen on the target by a user with a SWIR vision system, while remaining invisible the naked eye as well as to conventional night vision and/or thermal imaging systems, thus providing a more covert aiming or sighting beam. As used herein, the term "appears as a substantially continuous beam" is intended to encompass a pulsed beam wherein the frequency and laser-on time is sufficient to be human perceptible to a user wearing a SWIR-sensitive vision system, and is not intended to preclude some perceptible fluctuations in intensity as a result of the pulsed nature of the beam, nor is it intended to preclude operating the laser 112 to provide a flashing beam 116 which alternates between periods of time much longer than the time between pulses during which the beam appears as a substantially continuous beam, followed by periods of time in which the laser is off, such that a blinking or flashing effect is created.

In preferred embodiments, when the mode selector knob or switch 146 is in the "SWIR" position 164, the SWIR laser may still be actuated in range finding mode by pressing the button or switch 142. In certain embodiments, if the SWIR is being operated in aiming/pointing mode when the range button or switch 142 is pressed, the SWIR laser is momentarily switched from aiming mode to range finding mode to emit a range finding beam and then automatically resumes operation in aiming mode once the range finding pulse has been emitted. In other embodiments if the SWIR is being operated in aiming/pointing mode when the range button or switch 142 is pressed, the SWIR laser switches from aiming mode to range finding mode and is then shut off.

When the mode selector knob or switch 146 is in the "VIS LASER" position 166, the button or switch 144 is operable to actuate a visible laser module or assembly 190 including a visible laser 192 and associated optics 194. The button or switch 144 can be actuated in this mode to emit a visible (e.g., red or green) beam 196 for sighting/pointing, e.g., by placing a visible laser dot on a target, visible to the naked eye or diurnal vision systems. When the mode selector knob or switch 146 is in the "VIS LASER" position 166, the SWIR laser may still be actuated in range finding mode when the button or switch 142 is pressed.

When the mode selector knob or switch 146 is in the "FUNCTION" position 162, the lasers 112, 174, 184, and 194 cannot be actuated. The buttons or switches 142, 144, 168, may be used to access various programmable features of the unit 100, such as laser power or intensity or other user preference settings, and so forth. For example, in certain embodiments, when in the FUNCTION mode, the buttons or switches 142, 144, 168 could be used to select a desired intensity, for example, to toggle between high and low intensity (e.g., to reduce the laser power output to a so-called or designated "eye safe" levels), or, alternatively, to select a desired intensity from within a range of intensities.

Although the mode selector knob or switch 146 has been described as a manually rotatable knob in the depicted preferred embodiment, it will be recognized that the manual mode selector knob or switch 146 could be replaced with a user operable on-screen interface, such as a menu-driven hierarchy navigated via the display 136 using buttons, a keypad, touch pad, touch screen, joy stick, etc.

In certain embodiments, a remote trigger port 147 may be provided to access various functions and actuate the unit 100 via a remote control unit connected to the port 147.

In certain embodiments, the laser output power of the one or more of the laser units (112, 172, 182, 192) is adjustable. A low power eye safe mode is useful, for example, in preventing eye damage when using the unit 100 during training exercises.

In certain embodiments where adjustable laser output is provided, the laser output power is set to a desired level at the factory, e.g., to operate in either a low power (e.g., eye safe) mode or high power laser mode, but is not otherwise adjustable by the end user.

In other embodiments where adjustable laser output is provided, the laser output power can be toggled between a low power mode and a high powered mode. In some embodiments, the laser power level toggle function can be accessed using the buttons on the unit 100, e.g., via a function menu appearing on the display screen 136. preferably, onscreen indicia may be provided designating the selected laser power output level.

Figure 5:
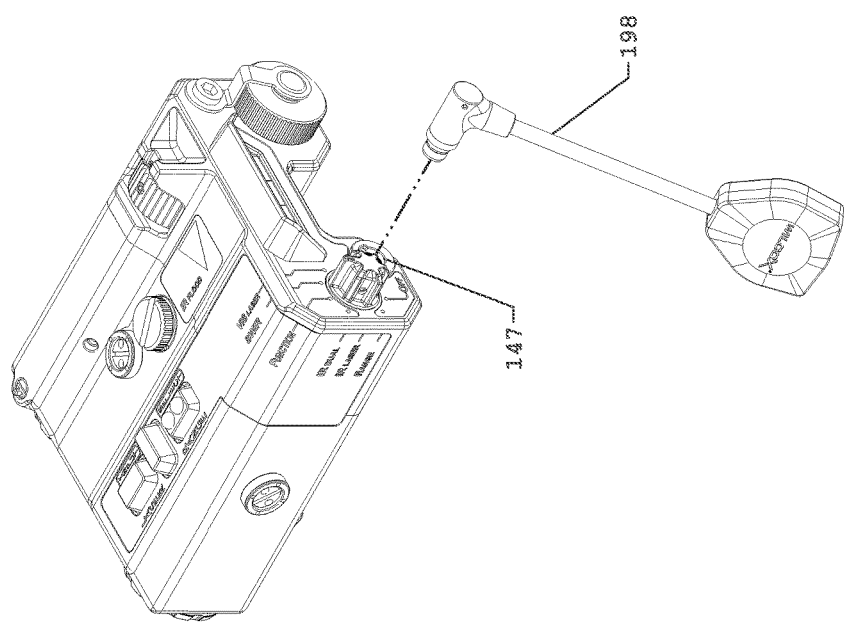
FIG. 5 illustrates an optional laser safety key provided to prevent inadvertent or unauthorized changes to the laser output power level.
Figure 6:
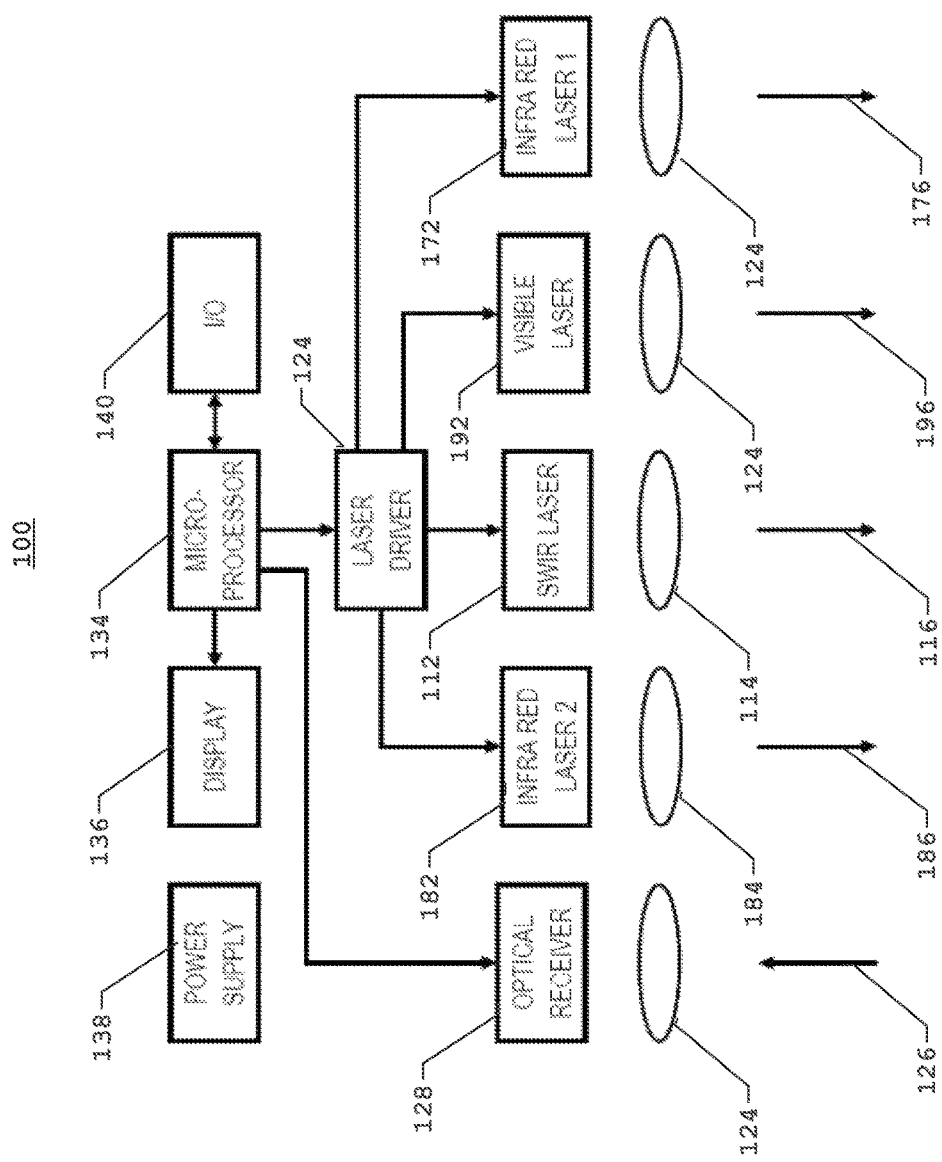
FIG. 6 is a functional block diagram illustrating the architecture of the FIG. 1 embodiment.

In preferred embodiments, an adjustable laser power level is provided, wherein adjustment of the laser power level requires a laser safety key 198 as shown in FIG. 5. In the illustrated embodiment, the laser safety key 198 is plugged into the remote trigger connection port 147, although it will be recognized that a dedicated laser safety key port could also be provided.

In embodiments employing a laser safety key, when it is desired to change the power mode, the laser safety key 198 is inserted into the remote trigger connection port 147. In a preferred embodiment, when the laser safety key 198 is not plugged into the port 147, only the current laser power mode will be available, e.g., when accessing a laser power selection menu displayed on the display screen when navigating an on-screen function menu hierarchy using the buttons. In this manner, personnel are prevented from accidentally switching from a low (e.g., eye safe) power mode to a high (e.g., eye damaging) power mode when in training and likewise accidentally switching from a low (e.g., eye safe) power mode to a high (e.g., eye damaging) power mode when operating in the field.

It is contemplated that in some instances, the key could be issued to the end user, who could set the unit to a desired laser power level and remove the key to prevent the possibility that the laser output mode would be changed until the key is reinserted. In other instances, it is contemplated that access to the key can be limited to certain supervisory personnel, who would use the key to set the desired laser power level prior to issuing the units to the end users to thereby restrict the end user's ability to alter the power level.

In some embodiments, the key 198 unlocks power level selection options, thereby enabling the user to navigate the menu hierarchy via the display screen and input buttons. Alternatively or additionally, in certain embodiments, when it is desired to change the power output mode, the key 198 is inserted into the connection port 147 and the unit 100 is activated. When the unit 100 is activated while the key 198 is present in to port 147, the output power to toggle between low power output and high power output or vice versa. An indication of the new power setting is preferably output to the LED display. Powering the unit off by rotating the mode selector knob or switch 146 to the off position 152 and removing the laser safety key 147 from the connection port 198 will cause the unit 100 to remain at the currently selected power level until it is changed again with the safety key.

Preferably, when the power level is set to high power mode, all lasers will operate in the high power (e.g., non eye-safe) mode and when the power level is set to the low power mode, all lasers will activate at low power (e.g., eye safe) mode. However, in other embodiments, individual adjustment of the laser power output is also contemplated.

In certain embodiments, setting the laser power output to the high power mode may cause the laser output to be set to some predetermined or fixed high power level and setting the laser power output to the low power mode may cause the laser output to be set to some predetermined or fixed low or eye-safe power level.

In other embodiments, there is provided a range of selectable laser power levels. The number of levels may be, for example, from 5 to 10, and preferably about 8. When a range of laser power levels is provided, the toggle function between high and lower power modes functions to limit the maximum laser power output level. For example, when the high power mode is selected, the full range of laser power output levels are available, but when the low power mode, only levels that do not exceed some preselected power level (e.g., a level which is eye-safe) are available.

In certain embodiments, the laser power output level is adjusted using the input buttons to navigate the menu hierarchy, e.g., when the mode selector knob or switch 146 is in the function position 162. In preferred embodiments, the laser power level is adjustable when in a pointing and/or illumination mode, an exemplary implementation of which is described below.

Figure 7:
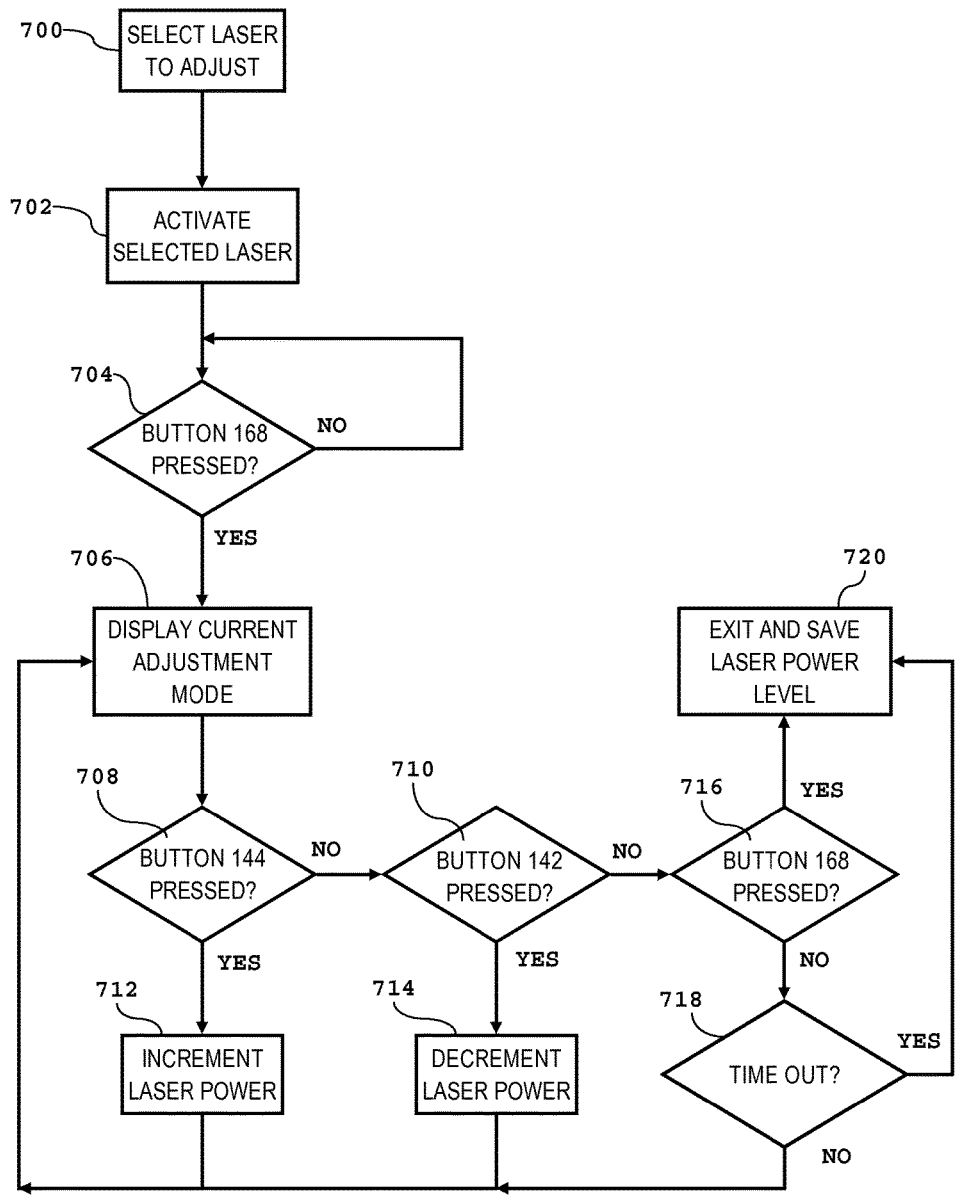
FIG. 7 is a flow diagram illustrating an exemplary laser power adjustment method.

A flow chart illustrating an exemplary manner of adjusting the laser power output level when in a pointing or illumination mode, i.e., "on the fly," appears in FIG. 7. An advantage of allowing intensity adjustments to be made during activation of the laser is that the user can visualize the laser (using appropriate viewing devices for the IR and SWIR lasers) to assist in setting a desired level.

In operation, the unit is placed in one of the one of the SWIR, visible, or infrared modes (step 700) and the selected laser (or lasers when Dual IR is selected) is activated using the button or switch 144 (step 702). At step 704, the state of the button 168 is monitored. If button 168 is pressed, the process proceeds to step 706 and the current adjustment mode is displayed. If the button 168 is pressed at step 704, pressing the buttons or activating the switches 144 (step 708) and 142 (step 710) function to incrementally increase (step 712) and decrease (step 714), respectively, the laser power output level.

In exemplary embodiments, if the unit 100 is set to a low power mode, the buttons or switches 144 and 142 allow the user to increment or decrement the laser power level only within the low or eye safe power range, e.g., powers "0" through "3." Likewise, if the unit 100 is set to a high power mode, pressing the buttons or switches 144 (step 708) and 142 allow the user to increment or decrement the laser power level within the full power range, e.g., powers "0" through "7." It will be recognized that other numbers of incremental steps are possible.

Once the desired laser intensity level has been selected with the buttons or switches 144 and 142, pressing the butting 168 (step 716) will save the changes to memory and exit the power adjust mode (step 720), such that the saved power level will be used for subsequent actuations of the adjusted laser. In certain embodiments, the unit 100 proceeds to step 720 and saves the changes automatically and exits after a predetermined period of inactivity (step 718) has occurred, e.g., if the engage button 168 is not pressed after some predetermined period of time, such as 5 seconds.

In the preferred embodiments, the selection between the low (e.g., eye-safe) and high (e.g., eye damaging) modes will apply globally to all lasers, while the selection of a power level within the selected mode using the buttons or switches 142, 144, and 168 will be saved for each laser individually.

With reference to FIGS. 1-6, the electronic components of the unit 100, including the lasers and the laser electronics 132, the microprocessor 134, the display 136, the sensor 128, and so forth, are powered by an internal power supply 138 such as a battery or a battery pack, received within a compartment in the housing 102 and accessible via a cover 108. In certain embodiments, the power supply may also be used to power an attached accessory electrically coupled to the unit 100. In alternative embodiments, the unit 100 may be powered by an external power supply, such as a power supply of an electrically coupled accessory or a remote power supply. For example, power may be supplied to the unit over a powered accessory mounting rail.

The illustrated unit 100 is adapted for attachment to a weapon rail interface, such as a Picatinny rail interface. In the illustrated preferred embodiment, the unit 100 includes a channel 210 receiving a weapon rail interface (not shown) and threaded fastener 212 which removably engages a complimentary threaded hole in the rail interface, avoiding the need for a rail clamp. For example, the fastener 212 may be ¼"-20 bolt engaging a tapped ¼"-20 hole on the mounting rail. Alternatively, a rail clamp or rail grabber may be employed to mechanically secure the unit 100 to a firearm.

A first adjustment screw 214 is provided for elevation adjustment for alignment of the laser module 180 and a second adjustment screw 216 is provided to provide an azimuth or windage adjustment of the laser module 180. The laser modules 110, 170, and 190 may each have similar elevation and azimuth adjustment screws. The elevation and azimuth of the four laser modules may thus be co-aligned to within some predetermined accuracy relative to each other on the internal frame of chassis 220 prior to final assembly. For example, the four lasers can be co-aligned to each focus a beam within +/−0.5 mm at 25 meters. Once the laser modules are co-aligned with respect to each other, they may be affixed in a substantially permanent manner, for example with an epoxy or other adhesive.

One advantage of the depicted preferred embodiment herein resides in the use of separate a visible laser module, SWIR laser module, IR aiming laser module, and IR illumination module, such that the unit 100 can be repaired in the event one of more of the laser modules 110, 170, 180, and 190, or any other replaceable assembly within the unit 100 (e.g., the optical receiver module 120, main circuit board 218, etc.), becomes defective. By employing removable and replaceable components, the unit 100 can be repaired should one component or assembly malfunction, unlike many prior art laser range finder and sighting devices. Thus, the substantially permanent attachment of the laser in their fixed, co-aligned positions with a substantially permanent adhesive such as epoxy, as detailed above, does not preclude later removal of the substantially permanent adhesive, for example through the application heat to melt the cured epoxy or other adhesive, e.g., for the purpose of removing and replacing a defective module. In preferred embodiments, the housing 102 can be formed in separate sections, e.g., separate fore and aft case sections, wherein the each of the housing shell sections are individually replaceable.

Once the lasers are co-aligned relative to one another and the unit 100 is assembled, an elevation adjustment 222 and an azimuth adjustment 224 may be used to adjust the alignment of the unit 100 as a whole relative to a weapon, e.g., to boresight the unit 100 to the bore of the weapon and/or any other scopes or sights on the weapon. Although a weapon-mounted unit 100 is disclosed herein, it will be appreciated that other configurations are also contemplated. For example, the unit 100 as shown could also be removed from a weapon and used as a hand held unit. In certain other embodiments, a unit designed for handheld use only is also contemplated. In still other embodiments, a unit as described herein could be integrated as a built in or stock feature on a firearm.

The invention has been described with reference to the preferred embodiments. Modifications and alterations will occur to others upon reading and understanding the preceding detailed description. It is intended that the invention be construed as encompassing all such modifications and alterations.

What is claimed is:

1. A combined range finding and sighting apparatus for a weapon, comprising:
    a housing therein supporting one or more laser emitters, an optical detector, and a processor;
    said one or more laser emitters including a first laser emitter operable in a first mode for emitting an optical signal toward the target and said optical detector for detecting the optical signal reflected from the target;
    said processor coupled to a computer readable memory encoded with executable instructions, the processor configured, upon execution of the executable instructions, to calculate a distance to the target based on a time of flight of the optical signal;
    said first laser emitter operable in a second mode for projecting a first beam onto the target, wherein the first beam is selected from the group consisting of one or both of a target aiming beam and a target designating beam;

a first actuator switch on the housing configured to cause the first laser emitter to operate in the first mode of operation;

a second laser emitter supported within said housing and configured to project a second beam substantially in alignment with a trajectory of a projectile fired from the weapon;

a selector for selecting one of the first laser emitter and the second laser emitter; and a second actuator switch on the housing configured to cause the first laser emitter to operate in the second mode of operation when the first laser emitter is selected and to actuate the second laser emitter when the second laser emitter is selected.

2. The apparatus of claim 1, wherein the first beam is substantially in alignment with a trajectory of a projectile fired from the weapon.

3. The apparatus of claim 1, wherein the first laser emitter is configured to emit electromagnetic radiation having a wavelength which is visible to a night vision system employing a short wave infrared imaging system.

4. The apparatus of claim 3, wherein the short wave infrared imaging system is of the type having an indium gallium arsenide (InGaAs) sensor.

5. The apparatus of claim 1, wherein the second laser emitter is selected from a visible laser emitter and an infrared laser emitter.

6. The apparatus of claim 5, wherein the second laser emitter is a near-infrared laser emitter.

7. The apparatus of claim 1, further comprising:
a third laser emitter supported within said housing and configured to project a third beam substantially in alignment with the trajectory of the projectile fired from the weapon, wherein the second laser emitter is an infrared laser emitter and the third laser emitter is a visible laser emitter.

8. The apparatus of claim 7, further comprising:
said selector for selecting one of the first laser emitter, the second laser emitter, and the third laser emitter; and
said second actuator switch on the housing configured to cause the first laser emitter to operate in the second mode of operation when the first laser emitter is selected, to actuate the second laser emitter when the second laser emitter is selected, and to actuate the third laser emitter when the third laser emitter is selected.

9. The apparatus of claim 7, further comprising:
an illuminator supported within said housing, said illuminator including a light emitting element for illuminating the target.

10. The apparatus of claim 9, wherein the light emitting element is a fourth laser emitter.

11. The apparatus of claim 9, wherein the fourth laser emitter is an IR laser emitter.

12. The apparatus of claim 9, further comprising:
adjustable optics for adjusting a beam angle of light emitted by the illuminator.

13. The apparatus of claim 9, further comprising:
said selector for selecting one of the first laser emitter, the second laser emitter, the second laser emitter in combination with the illuminator, and the third laser emitter; and
said second actuator switch on the housing configured to cause the first laser emitter to operate in the second mode of operation when the first laser emitter is selected, to actuate the second laser emitter when the second laser emitter is selected, to actuate the second laser emitter in combination with the illuminator when the second laser emitter in combination with the illuminator is selected, and to actuate the third laser emitter when the third laser emitter is selected.

14. The apparatus of claim 13, further comprising:
the selector further including a "range" selection, wherein the second actuator switch is disabled when the selector is in the "range" selection.

15. The apparatus of claim 13, wherein the selector is a rotary switch.

16. The apparatus of claim 13, further comprising a human viewable display, wherein the selector is a user operable display screen interface displayed on the human viewable display.

17. The apparatus of claim 1, further comprising:
an illuminator supported within said housing, said illuminator including a light emitting element for illuminating the target.

18. The apparatus of claim 1, further comprising a fastener for attaching said apparatus to a firearm.

19. The apparatus of claim 18, wherein the fastener is a clamping member configured to attach to a firearm rail interface.

20. The apparatus of claim 1, further comprising one or more mechanical sights on the housing.

21. The apparatus of claim 1, wherein the optical signal has a duration in the range of about 10 milliseconds to about 1000 milliseconds.

22. The apparatus of claim 1, wherein the optical signal comprises a plurality of optical pulses.

23. The apparatus of claim 1, wherein the first beam is selected from:
a continuous beam; and
a pulsed beam having a pulse frequency that is sufficiently high to allow the pulsed beam to appear as a substantially continuous beam.

24. The apparatus of claim 23, wherein the pulsed beam has a pulse frequency in the range of about 5 Hertz to about 60 Hertz.

25. The apparatus of claim 1, further comprising a display for displaying a numerical indication of the distance to the target.

26. The apparatus of claim 25, wherein the numerical indication of the distance to the selected target is selected from one or both of an actual distance to the selected target and an effective ballistic distance to the selected target.

27. The apparatus of claim 1, further comprising a power supply supported within the housing.

28. The apparatus of claim 1, further comprising:
a first adjustment means for changing an alignment of the apparatus to effect windage changes in a trajectory of a laser beam generated by the first laser emitter; and
a second adjustment means for changing the alignment of the apparatus to effect elevation changes in the trajectory of the laser beam generated by the first laser emitter.

29. The apparatus of claim 1, wherein said one or more laser emitters are removably supported in the housing.

30. The apparatus of claim 1, further comprising:
a laser module removably supported in the housing;
said laser module including said first laser emitter and at least one additional laser emitter, wherein each of said at least one additional laser emitter is affixed in co-aligned relation with said first laser emitter.

31. The apparatus of claim 1, wherein the housing comprises two or more replaceable housing sections.

32. The apparatus of claim 1, wherein a power level of at least one of the one or more laser emitters is adjustable.

33. The apparatus of claim 1, further comprising a laser power level adjustment for toggling a power level of the one or more laser emitters between a first power mode and a second power mode, wherein the first power mode is higher than the second power mode.

34. The apparatus of claim 33, wherein the one or more laser emitters are configured to operate at a power level that does not cause damage to a human eye when the low power mode is selected.

35. The apparatus of claim 33, further comprising:
a safety key removably connected to the apparatus, wherein the power level of the one or more laser emitters is adjustable when the safety key is connected to the apparatus and the power level of the one or more laser emitters is not adjustable when the safety key is removed from the apparatus.

36. The apparatus of claim 1, wherein said one or more laser emitters comprises a plurality of laser emitters and a power level of each of the laser emitters is individually adjustable.

37. The apparatus of claim 1, wherein a power level of at least one of said one or more laser emitters is adjustable when the at least one of said one or more laser emitters is activated.

38. The apparatus of claim 1, wherein said first laser emitter is a short wave infrared (SWIR) laser emitter.

39. The apparatus of claim 1, wherein the first laser emitter is configured to emit electromagnetic radiation having a wavelength that is invisible to one or both of a human eye and a night vision device employing an image intensifier.

40. The apparatus of claim 1, wherein the first laser emitter is configured to emit electromagnetic radiation having a wavelength in the range of from about 1400 nm to about 3000 nm.

41. The apparatus of claim 40, wherein the wavelength is approximately 1550 nm.

42. A combined range finding and sighting apparatus for a weapon, comprising:
a housing therein supporting one or more laser emitters, an optical detector, and a processor;

said one or more laser emitters including a first laser emitter operable in a first mode for emitting an optical signal toward the target and said optical detector for detecting the optical signal reflected from the target;

said processor coupled to a computer readable memory encoded with executable instructions, the processor configured, upon execution of the executable instructions, to calculate a distance to the target based on a time of flight of the optical signal;

said first laser emitter operable in a second mode for projecting a first beam onto the target, wherein the first beam is selected from the group consisting of one or both of a target aiming beam and a target designating beam;

a laser power level adjustment for toggling a power level of the one or more laser emitters between a first power mode and a second power mode, wherein the first power mode is higher than the second power mode; and a safety key removably connected to the apparatus, wherein the power level of the one or more laser emitters is adjustable when the safety key is connected to the apparatus and the power level of the one or more laser emitters is not adjustable when the safety key is removed from the apparatus.

* * * * *